Oct. 7, 1952 — A. W. PEARCE — 2,612,702
CHAIN SAW GAUGE
Filed May 8, 1946 — 2 SHEETS—SHEET 1
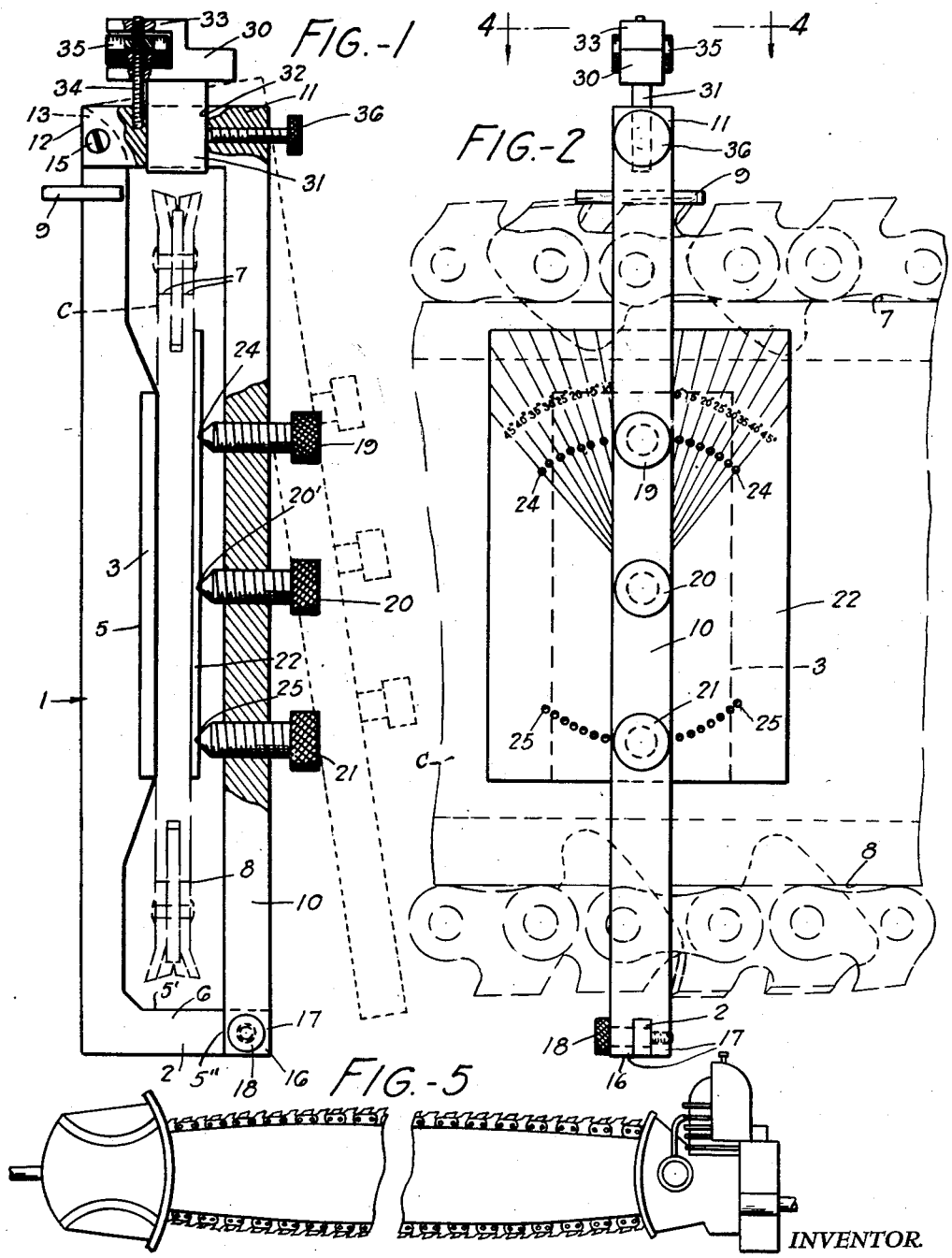
INVENTOR.
ARTHUR W. PEARCE
BY Victor J. Evans & Co.
ATTORNEYS Oct. 7, 1952     A. W. PEARCE     2,612,702
CHAIN SAW GAUGE
Filed May 8, 1946     2 SHEETS—SHEET 2
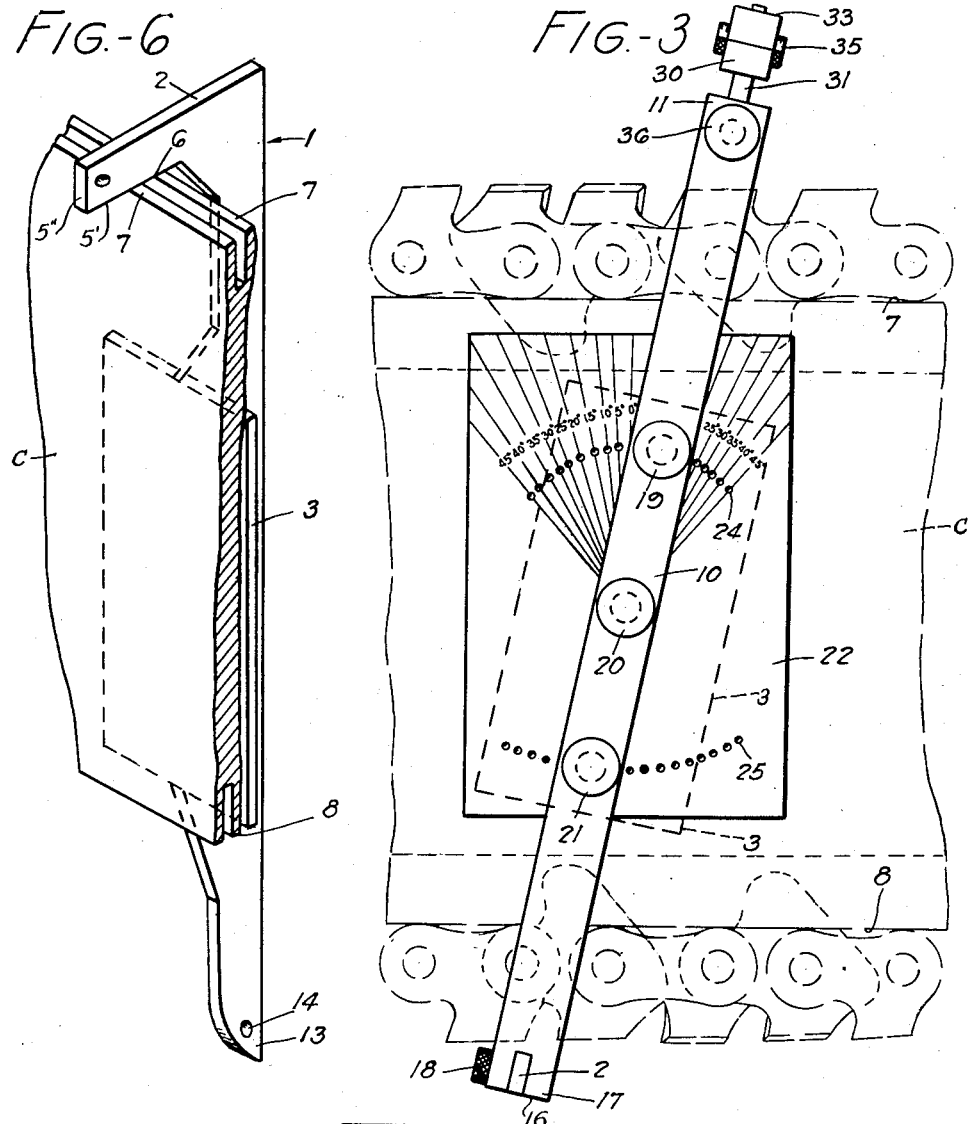
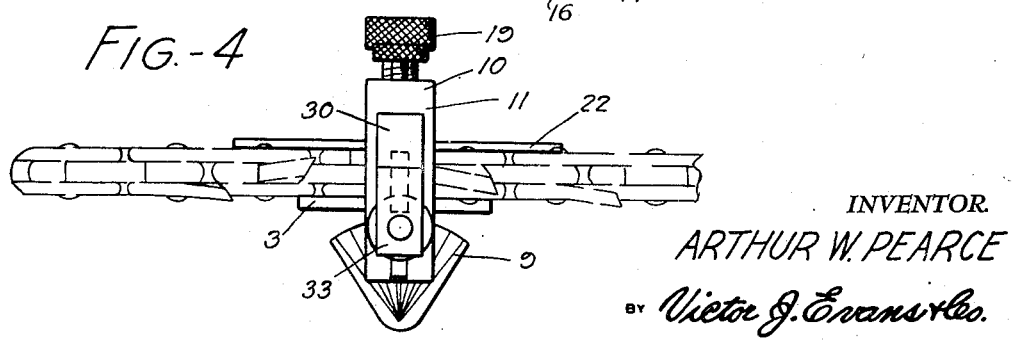
INVENTOR.
ARTHUR W. PEARCE
BY Victor J. Evans & Co.
ATTORNEYS Patented Oct. 7, 1952

2,612,702

UNITED STATES PATENT OFFICE 2,612,702

CHAIN SAW GAUGE

Arthur W. Pearce, Whittier, Calif.

Application May 8, 1946, Serial No. 668,223

11 Claims. (Cl. 33—202)

My present invention relates to an improved chain saw gauge and has for its principal purpose the provision of a multipurpose gauge capable of determining the condition of the cutter bar, the pitch of the teeth, and the depth of the teeth in separate operations but with the same instrument.

The gauge of my invention generally consists of a frame one portion of which may be used as a testing square to determine the perpendicularity of the plane of the cutter bar edges to the plane of the cutter bar, an adjustable gauge mounted upon one side of the frame, and a pitch gauge adapted for adjustable insertion in the frame whereby the frame may be rotated pivotally on the pivot of the gauge to align the pitch grade marking as desired.

In the accompanying drawings I have illustrated one complete example of the physical embodiment of my invention according to the best mode I have thus far devised, but it will be understood that various changes and alterations may be made in the exemplified structure within the scope of the appended claims.

In the drawings:

Figure 1 is a side elevational view of the gauge of my invention.

Figure 2 is a front elevational view thereof.

Figure 3 is a side elevational view showing the gauge in position to measure or determine the pitch at, or to be applied, to the teeth.

Figure 4 is a top plan view of the gauge.

Figure 5 is an assembly view of the type of chain saw upon which my invention is adapted for use.

Figure 6 is a perspective view showing the application of one section of the gauge frame against the cutter-bar.

Referring now to the drawings in detail, I have illustrated a frame 1 preferably made of hard lightweight metal, and having a leg 2 at right angles thereto. A plate 3 integral with, or attached to, the frame 1 provides a stabilizing surface for the frame 1 when used as a square. The sides 4 of the frame 1 and 6 of the leg 2 are accurately machined to form straight edges 5, 5' and 5" respectively for the frame, and as seen in Figure 6, the frame 1 with the plate 3 in engagement with the straight edge 5 is placed so that the side of the plate 3 rests against the cutter bar C with the straight edge 5' of the leg 2 upon the upper edge 7 of the cutter bar C to determine whether or not the plane of the cutter bar edges 7 is perpendicular to the plane of the cutter bar.

Upon the upper portion of the frame 1 I have mounted a graduated gauge 9 which is used to indicate the angle of set of the cutting edge.

A frame 10 is adapted for association with the frame 1 and is fashioned with a leg 11 at right angles to the frame and this leg is bifurcated as at 12 to receive the end 13 of the frame 1. A hole 14 is provided to receive the retaining screw 15. The end 16 of the frame 10 is also bifurcated as at 17 to receive the outer end of the leg 2 of frame 1 and a screw 18 is provided to retain the frame elements together.

The frame 10 is fashioned with threaded openings for the adjustment screws 19, 20, and 21 and the separate gauge plate 22 is positioned within the frame and against the side of the cutter bar C, as shown in Figure 1, so that the vertical axis of the plate is at right angles to the longitudinal axis of the cutter bar, and thereby bringing the upper edge of the plate parallel with the top 7 of the cutter bar. The gauge plate 22 is separate from the frame 10 and screws 19, 20 and 21. The gauge plate has on its surface markings to indicate various degrees from the vertical, the markings being on each side of the center of the plate. A central depression or countersink 20' receives the end of the screw 20, and an arcuate series of countersinks 24 is selectively adapted to receive the end of the screw 19. A lower opposed arcuate row of countersinks 25 is selectively adapted to receive the end of the screw 21.

Thus, when the frames 1 and 10 have been assembled about the cutter bar, as shown in Figure 1, the gauge plate 22 is positioned by any method well known in the art so that its vertical axis is perpendicular to the longitudinal axis of the cutter bar. The screws 19, 20 and 21 are then tightened, thereby locking the plate 22 to the cutter bar C. To adjust the frames 1, 10 to the desired degree of angularity, the screws 19 and 21 are withdrawn from the countersinks 24 and 25, respectively, and the frames 1 and 10 swung on screw 20 as a pivot until the desired degree of pitch is selected. The screws 19 and 21 may then be screwed home into the respective rows of countersinks, thereby locking the figures 1, 10 and 22 in position against the cutter bar c (Fig. 1). The straight edges 5 and 5" are then employed as guiding surfaces for determining the pitch angle of the leading cutting edge of each saw tooth.

An additional gauge is required to determine the height of the teeth and to provide an accurate measure for filing or otherwise adjusting the teeth to a uniform height. Thus, I employ a gauge 30 having a depending lug 31 positioned within the longitudinal slot 32 of the arm 11 of frame 10. A spaced support 33 is fashioned on the gauge and a stud 34 rotatable in the gauge and in the arm 11 carries thereon in the space between the member 30 and the support 33 a micro-gauge 35. The depending lug may, by rotation of the micro-gauge be elevated or lowered with relation to the teeth of the chain saw and then held in the desired position by the screw 36 which bears against the lug 31 to secure it in adjusted position. By placing a straight edge on the gauge 9 and against the side of a saw tooth, the angle of set is determined (see Fig. 4), that is, the side inclination of a saw tooth, for reasons well known to the art.

From the above description it will be apparent that the chain saw gauge of my invention contemplates means for making necessary adjustments or corrections as may be required for the chain saw, and the device, simple in construction and operation, and durable in use, provides all of the necessary gauge markings and indications for properly correcting all of the inaccurate alignments from which such saws will suffer even in normal careful use.

Having thus fully described my invention what I claim as new and desire to secure by Letters Patent is:

1. A chain saw gauge comprising an aligning frame including separable sections, one section being a right angle formed with straight edges, a gauge plate having radial markings and having a series of depressions aligned with said markings, means on the frame for holding the gauge plate in position against a cutter bar of a chain saw, and a screw in the frame engageable with one of said series of depressions to secure the frame in aligned position.

2. A chain saw gauge comprising an aligning frame, a gauge plate having a series of depressions and a series of radial markings coinciding with said depressions, an opposed series of depressions on said gauge plate, means on the frame for holding the frame in rotatable position with relation to said gauge plate, and spaced screws in the frame engageable with said opposed depressions to secure the frame in adjusted position.

3. A chain saw gauge comprising a frame including separable sections, one section being a right angle formed with straight edges, a gauge plate, means on one section for holding the gauge plate in position against a cutter bar of a chain saw, said means including a pivot for the frame for movement relative to the gauge plate.

4. A chain saw gauge comprising a frame including separable sections, one section being a right angle formed with straight edges, a micro-gauge on one leg of the said section, a gauge plate, means on one of said sections for holding the gauge plate in position against a cutter bar of a chain saw, said means including a pivot for the frame for movement relative to the gauge plate.

5. In a chain saw gauge, the combination of a rectangular frame, a base plate fixed to said frame perpendicularly to the same, said base plate being adapted for placement against a cutter bar of a chain saw, a detachable gauge plate opposite said base plate and in said frame for engaging the cutter bar opposite said base plate, said gauge plate and said frame being angularly adjustable relative to each other, locking means on said frame engaging one of said plates for moving said plates toward each other and against the cutter bar for adjustably locking said frame relative to said gauge and to the cutter bar.

6. The combination of claim 5, wherein the locking means on said frame includes a pivot means on said frame engaging the gauge plate for relative rotation between said frame and gauge plate and a clamping means on the frame releasably engaging the gauge plate for adjustably locking the frame relative to the gauge plate.

7. The combination of claim 6, wherein the pivot means and the clamping means are movable transversely of the frame to force said plates against said cutter bar.

8. The combination of claim 7, wherein said pivot means includes a pivot screw threaded through the frame and said clamping means includes a set screw and a locking screw threaded through the frame.

9. The combination of claim 8 and a pivot concavity on said gauge plate, an arcuate series of depressions on said gauge plate radially spaced from said pivot concavity, an arcuate series of indentations diametrically positioned opposite corresponding of said depressions, indicia lines extending through said depressions and directed radially toward the pivot concavity to indicate degrees of rotation, a tapered pivot portion on the pivot means and oscillatably located in said pivot concavity, the set screw being positioned on the frame radially of said pivot screw and adapted to selectively engage said depressions, the locking screw being diametrically positioned from said set screw on the frame for selectively engaging said indentations, whereby said pivot, set and lock screws may lock the frame in selected angular positions relative to the gauge plate.

10. The combination of claim 5 wherein said rectangular frame consists of a pair of L-shaped members, means hingedly pivoting one end of each member together for movement to embrace a chain saw and the cutter bar therefor and means on the other end of each member for releasably locking the same together.

11. In a saw gauge and jointer, a frame including an elongated arm, a leg arranged at right angles with respect to said arm and secured thereto, a spacer secured to the inner surface of said arm for engaging a side of a saw, an L-shaped body member connected to said leg, a pivot screw and a plurality of holding screws extending through said body member and provided with pointed ends, a clamping plate interposed between said spacer and body member and provided with holes for receiving the pointed ends of said screws, and gauging element carried by said body member.

ARTHUR W. PEARCE.

REFERENCES CITED

The following references are of record in the file of this patent:

UNITED STATES PATENTS

| Number | Name | Date |
|---|---|---|
| 198,458 | Grogan | Dec. 25, 1877 |
| 1,730,484 | St. Clair | Oct. 8, 1929 |
| 1,814,266 | Stauder | July 14, 1931 |
| 2,079,215 | Kenney | May 4, 1937 |